No. 685,879. Patented Nov. 5, 1901.
L. W. SPAULDING.
DEVICE FOR REMOVING CORES FROM CYLINDRICAL BALES.
(Application filed Nov. 20, 1900.)
(No Model.)
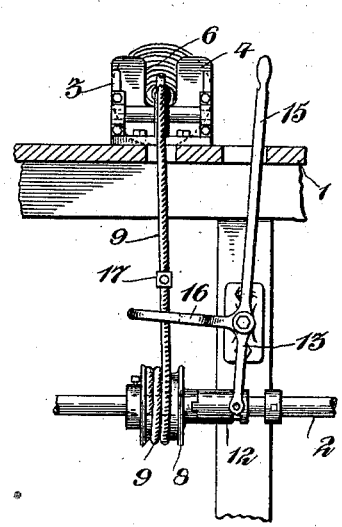
WITNESSES:
F. N. Roehrich
Pennington Halsted
INVENTOR
Lewis W. Spaulding
BY
J. H. Freeman
ATTORNEY

UNITED STATES PATENT OFFICE.

LEWIS W. SPAULDING, OF DEMOPOLIS, ALABAMA.

DEVICE FOR REMOVING CORES FROM CYLINDRICAL BALES.

SPECIFICATION forming part of Letters Patent No. 685,879, dated November 5, 1901.

Application filed November 20, 1900. Serial No. 37,130. (No model.)

*To all whom it may concern:*

Be it known that I, LEWIS W. SPAULDING, a citizen of the United States, residing at Demopolis, in the county of Marengo and State of Alabama, have invented a new and useful Improvement in Devices for Removing the Cores from Cylindrical Bales, of which the following is a specification.

My invention relates to cotton-baling machinery, and more particularly to a device for removing the cores upon which cylindrical cotton bales are formed in the press. Heretofore it has been the common practice to drive these cores out of the bales with a heavy sledge and a driving-pin, a great expenditure of time and labor being involved in the operation. This method of removing the cores, moreover, often results in defacement of the bales and injury to the cores.

My invention has for its object to do away with this hand operation and the inconveniences and delays and expenses incident thereto.

With this object in view my invention consists in the novel parts, improvements, and combinations herein shown and described.

The accompanying drawings, which are referred to herein and form a part hereof, illustrate one embodiment of my invention and serve, in connection with the description herein, to explain the principles of my invention and the best mode contemplated by me of applying those principles.

Referring to the drawings, Figure 1 is an end elevation of a core-removing device constructed in accordance with my invention. Fig. 2 is a side elevation of the same with a bale in operative position and the core partly removed, the bale and the core being shown in section to more clearly illustrate the operation of the device. Fig. 3 is a sectional plan view of the power and clutch devices. Figs. 4, 5, and 6 are detail views illustrating the core and the means for connecting the power devices thereto.

The core-removing device comprises in general a support against which one end of a cylindrical bale may be placed, a power device, intermediate connections between the power device and the core in the bale, means for readily connecting and disconnecting the intermediate connections and the core, and automatic means for disconnecting the intermediate connections from the power device when the core has been removed.

Referring to the drawings in detail, 1 represents the floor of a press-room, and 2 is the continuously-rotating line-shaft commonly provided for driving the presses, said shaft being located below the floor, as shown.

In carrying out my invention I find it most convenient to obtain the force for withdrawing the core from the bale directly from the shaft 2. To accomplish this without making it necessary to lift the bale off the floor 1 or turn it up on end, a horizontal frame 3 is provided and secured to the floor 1 with one end above the shaft 2. The opposite end of the frame 3 is provided with a vertical wall or face-plate 4, against which the end of a bale 5 of cotton may be placed by simply rolling the bale into position. The face-plate 4 is provided with a slot 6, through which the cores 7 are extracted from the bales. The intermediate connections between the power-shaft 2 and the cores 7 consist of a drum 8, loosely mounted upon the shaft 2, a chain or cable 9, and a key-pin or bolt 10. One end of the cable 9 is securely connected to the drum 8 and the other end is connected to the key-pin 10, preferably by a swivel-piece 11. A guide-wheel 9ª is journaled at the rear end of the frame 3 to give proper direction to the cable 9 with relation to the core and power device. The drum 8 may be connected to rotate with the shaft 2 when desired by means of a clutch, the longitudinally-movable member 12 of which is splined on the shaft and is provided with a clutch-face adapted to engage a corresponding clutch-face formed on the hub of the drum 8. The sliding member 12 of the clutch is controlled by a lever 13, which is pivoted to a suitable support 14 and provided with an arm 15, projecting above the floor 1, so as to be within reach of the operator.

It is desirable to automatically disconnect the drum 8 from the shaft 2 when the core has been extracted, so as to prevent any injury to the device which might be caused by a continued winding of the cable upon the drum. This is accomplished in the construction shown by providing the lever 13 with an arm 16, the free end of which is preferably slotted and so located as to embrace the cable 9. The latter is provided with a projection or collar 17, which is so adjusted as to engage the arm 16 and operate it to disengage the clutch when the core is loosened in or entirely removed from the bale.

For the purpose of readily attaching and detaching the cable to the core the end of the latter is bored out and threaded or otherwise grooved, as at 18, and then the threads or grooves are cut away or slotted at one or more points, as at 19, so that the correspondingly threaded and flattened end 20 of the key-pin 10 may be pushed directly into the core or pulled directly out thereof and locked or unlocked therein by a partial turn, a handle 21 being provided to facilitate these operations.

The operation of my device having been fully set forth in connection with the description of the construction, further description thereof will not be required.

I am aware that it has been proposed to construct a baling-press with a permanent core and power mechanism for removing the same from the bale and that the core has been connected to the power mechanism by a swivel connection which might be taken apart, as shown in the patent to Anderson, No. 648,371. This construction, however, does not constitute the means for readily connecting the intermediate connections to the core and disconnecting the same therefrom, which constitutes an important feature of my invention. By reason of this construction my device is adapted to be successively engaged with a plurality of cores and remove them from the bales after the latter have been taken out of the press. By my invention the operation of removing the cores is made entirely independent of the press and does not interrupt or interfere in any way with the baling operation. A single device, moreover, will remove the cores from the product of several presses, much time and expensive construction thus being saved.

My invention in its broader aspects is not limited to the precise construction shown nor to the particular construction by which it may be carried into effect, as many changes may be made therein without departing from the principles of the invention or sacrificing the main advantages thereof.

Having thus described my invention, what I claim is—

1. A device for removing the cores from cylindrical bales comprising means for holding a bale, a continuously-moving power device, intermediate connections between the core in the bale and the power device, means for readily connecting the intermediate connections to the core and disconnecting the same therefrom, and means for connecting and disconnecting the intermediate connections and the power device substantially as described.

2. A device for removing the cores from cylindrical bales comprising means for holding a bale, a power device, intermediate connections between the core in the bale and the power device, means for readily connecting the intermediate connections to the core and disconnecting the same therefrom and automatic means for disconnecting the intermediate connections from the power device when the core has been removed from or loosened in the bale substantially as described.

3. A device for removing the cores from cylindrical bales comprising a horizontal frame having a vertical face-plate against which the end of a bale may be placed, a continuously-moving power device below the frame, flexible connections between the core in the bale and the power device, and means whereby the flexible connections may be readily connected to or disconnected from both the core and the power device, substantially as described.

4. A device for removing the cores from cylindrical bales comprising a horizontal frame having a vertical face-plate against which the end of a bale may be placed, a power device below the frame, flexible connections between the core in the bale and the power device, means whereby the flexible connections may be readily connected to or disconnected from the core, and automatic means for disconnecting the flexible connections from the power device when the core has been removed from or loosened in the bale, substantially as described.

5. A device for removing the cores from cylindrical bales comprising means for holding a bale, a power-shaft, flexible connections between the core in the bale and the power-shaft, interlocking devices whereby the flexible connections may be readily connected to or disconnected from the core, and a clutch for connecting and disconnecting the flexible connections and the power-shaft, substantially as described.

Signed this 17th day of November, 1900.

LEWIS W. SPAULDING.

Witnesses:
EDW. J. GILDEN,
E. A. ZAISER.